United States Patent
Busboom et al.

(10) Patent No.: US 6,557,331 B2
(45) Date of Patent: May 6, 2003

(54) OPERATOR CONTROL SYSTEM FOR SELF-PROPELLED VEHICLES

(75) Inventors: Garry W. Busboom, Beatrice, NE (US); Gary L. Nicholson, Beatrice, NE (US)

(73) Assignee: Exmark Manufacturing Company, Inc., Beatrice, NE (US)

( * ) Notice: Subject to any disclaimer, the term of this patent is extended or adjusted under 35 U.S.C. 154(b) by 0 days.

(21) Appl. No.: 09/893,193

(22) Filed: Jun. 27, 2001

(65) Prior Publication Data
US 2003/0000190 A1 Jan. 2, 2003

(51) Int. Cl.$^7$ .............................................. A01D 69/00
(52) U.S. Cl. ................................... 56/10.8; 56/DIG. 18
(58) Field of Search ............................ 56/10.8, 11.1, 56/11.2, 11.3, 11.5, 11.6, 11.7, 11.8, DIG. 18; 180/19.1, 19.2, 19.3

(56) References Cited

U.S. PATENT DOCUMENTS

| | | |
|---|---|---|
| D180,775 S | 8/1957 | Ertsgaard et al. |
| 2,821,258 A | 1/1958 | Benson et al. |
| 2,863,328 A | 12/1958 | Sonmore |
| 3,077,065 A | 2/1963 | Samways et al. |
| D232,651 S | 9/1974 | Fernandez et al. |
| 4,212,141 A | 7/1980 | Miyazawa et al. |
| 4,213,288 A | 7/1980 | Takeuchi et al. |
| 4,487,006 A | 12/1984 | Scag |
| 4,558,558 A | 12/1985 | Horner, Jr. et al. |
| 4,663,923 A | 5/1987 | Boice |
| D295,865 S | 5/1988 | Rosenblad |
| 4,878,339 A * | 11/1989 | Marier et al. ............. 180/19.1 |
| 4,885,903 A * | 12/1989 | Scag ........................... 56/10.8 |
| 4,932,192 A | 6/1990 | Ishimaru |
| 4,967,543 A * | 11/1990 | Scag et al. ................... 56/10.8 |
| 4,991,382 A * | 2/1991 | Scag ........................... 180/315 |

(List continued on next page.)

OTHER PUBLICATIONS

Honda HRC7113TXA TruGear™ Commercial Mower Brochure, American Honda Motor Co., Inc. Alpharetta, GA; date 1997 (1 pg.).

TurfRanger [online], Exmark Mfg. Inc., Beatrice, NE [retrieved on Mar. 8, 2001]. Retrieved from the Internet URL <www.exmark.com/mowerImage.asp?mower=TurfRanger> (1 pg.), Date Mar. 8, 2001.

Three Wheel Riders [online], Scag Power Equipment, Mayville, WI [retrieved on Mar. 8, 2001]. Retrieved from the Internet URL <www.scag.com/3wheel/STHMimg.htm> (1 pg.)., Date Mar. 8, 2001.

*Primary Examiner*—Robert E. Pezzuto
*Assistant Examiner*—Árpád Fábián Kovács
(74) *Attorney, Agent, or Firm*—Mueting, Raasch & Gebhardt, P.A.

(57) ABSTRACT

An operator control system for a self-propelled vehicle such as a lawn mower, wherein the control system includes two opposing and preferably upwardly extending and converging hand grips each having a corresponding drive control lever associated therewith. Each drive control lever may have at least a portion that is parallel to a grip axis of its respective hand grip. Further, each drive control lever may have a pivot axis that is substantially parallel to the corresponding grip axis such that the drive control lever remains substantially parallel to its respective hand grip throughout its travel. A neutral lock is provided to permit locking of each drive control lever in at least one position, e.g., a neutral position. Secondary levers such as operator presence control (OPC) levers may also be included. An OPC lever is associated with each hand grip.

27 Claims, 7 Drawing Sheets

U.S. PATENT DOCUMENTS

| | | |
|---|---|---|
| 4,998,948 A | 3/1991 | Osterling |
| 5,127,215 A * | 7/1992 | Wenzel .................... 180/19.1 |
| 5,138,824 A | 8/1992 | Oshima et al. |
| 5,146,735 A | 9/1992 | McDonner |
| 5,155,985 A | 10/1992 | Oshima et al. |
| 5,195,307 A | 3/1993 | Thorud et al. |
| 5,261,214 A | 11/1993 | Wollersheim |
| 5,343,678 A | 9/1994 | Stuart |
| 5,355,662 A | 10/1994 | Schmidt |
| 5,375,674 A | 12/1994 | Peter |
| 5,488,818 A | 2/1996 | Powers et al. |
| 5,511,367 A | 4/1996 | Powers et al. |
| 5,518,079 A * | 5/1996 | Zvolanek .................. 180/19.1 |
| 5,601,512 A | 2/1997 | Scag |
| 5,653,466 A * | 8/1997 | Berrios ..................... 180/19.1 |
| 5,701,967 A | 12/1997 | Barnard |
| 5,740,613 A | 4/1998 | Swistun et al. |
| 5,806,374 A | 9/1998 | Mizutani et al. |
| 5,809,755 A | 9/1998 | Velke et al. |
| 5,822,961 A * | 10/1998 | Busboom .................... 56/10.8 |
| RE36,250 E | 7/1999 | Hess et al. |
| D423,018 S * | 4/2000 | Crosby et al. ............... D15/14 |
| D424,578 S | 5/2000 | Friberg et al. |
| 6,056,668 A | 5/2000 | Nagashima |
| 6,089,005 A * | 7/2000 | Kallevig .................... 56/10.8 |
| 6,094,897 A | 8/2000 | Velke et al. |
| 6,098,385 A | 8/2000 | Turk |
| 6,105,348 A | 8/2000 | Turk et al. |

* cited by examiner

OPERATOR CONTROL SYSTEM FOR SELF-PROPELLED VEHICLES

TECHNICAL FIELD

The present invention relates generally to self-propelled, ground-working vehicles such as lawn mowers and, more particularly, to operator control systems for use with the same.

BACKGROUND

Various types of lawn mowers are known. For example, small, walk-behind mowers are in general use by both homeowners and professionals alike. At the other end of the spectrum are large, riding mowers adept at mowing correspondingly large and typically unobstructed areas. Between these two categories lies what are commonly referred to as "mid-size" mowers.

Generally speaking, mid-size mowers are self-propelled units having a cutting width of approximately 36–60 inches. While they may be configured as either riding (including ride-on and ride-behind) or walk-behind units, walk-behind mowers potentially offer greater maneuverability. For example, walk-behind mowers are particularly efficient when mowing large lawns having numerous obstacles (e.g., trees, shrubs, flowerbeds, and the like) which necessitate intricate trimming, or when mowing lawns which may otherwise be ill-suited to high-speed riding mowers. Moreover, walk-behind mowers are often used in areas with steep slopes which may pose traction or tipping problems for riding mowers. Furthermore, mid-size, walk-behind mowers are also, in general, less expensive than riding mowers. While the present invention is directed to control systems for use with either riding or walk-behind vehicles, it will, for the sake of brevity, be described with respect to mid-size, walk-behind mowers.

One type of control system known for use with mid-size mowers uses two rearwardly extending handles each equipped with a scissors-type lever. Each lever operatively controls one of two drive wheels typically located at or near the rear corners of the cutting unit. Where the levers are configured as "normally engaged," actuating (e.g., squeezing) one of the drive levers causes disengagement and/or braking of the corresponding drive wheel, permitting the mower to turn about that wheel. Alternatively, the levers may be "normally disengaged" such that actuating (e.g., squeezing) one of the drive levers causes engagement of the corresponding drive wheel.

While scissors-type lever control systems are more than adequate for their intended purpose, drawbacks remain. For instance, scissors-type levers, in general, may provide limited mechanical advantage in overcoming lever tension. Accordingly, when cutting a lawn with many trees, shrubs, or other obstacles that necessitate numerous turns, discomfort in the hands, wrists, and arms may occur. Scissors-type lever control systems may also be susceptible to variation in lever tension over the lever travel. Furthermore, depending on the position of each lever within its throw, the operator may not be able to grasp the respective lever with all fingers.

Other systems are also known. For example, U.S. Pat. No. 5,511,367 to Powers et al. and U.S. Pat. No. 5,809,755 to Velke et al. disclose control systems having a generally transverse hand position. While addressing some of the above-identified problems, other issues with hand position and/or control actuation potentially remain.

SUMMARY OF THE INVENTION

Control systems of the present invention seek to overcome the above-identified drawbacks by providing operator control systems that combine natural hand positioning with conveniently located drive control levers. Control systems in accordance with the present invention further provide a hand position interior to the control system to reduce potential contact between the operator's hands and external objects during operation. The drive control levers of the present invention may additionally provide substantially constant tension throughout their range of motion, resulting in drive control lever forces which are more evenly distributed throughout the operator's hands.

In one embodiment, an operator control system for a self-propelled vehicle is provided. The control system includes a handle assembly having a first hand grip and a second hand grip, wherein the first hand grip and the second hand grip extend generally upwardly and towards one another when the vehicle is in an operating configuration. The system further includes a first control lever associated with the first hand grip, wherein the first control lever is pivotable about a first pivot axis. Preferably, the first pivot axis is substantially parallel to a first grip axis of the first hand grip. A second control lever associated with the second hand grip is also included. The second control lever is pivotable about a second pivot axis, wherein the second pivot axis is substantially parallel to a second grip axis of the second hand grip.

In another embodiment, an operator control system for a self-propelled lawn mower is provided having a handle assembly including a first hand grip defining a first grip axis and a second hand grip defining a second grip axis. The first grip axis and the second grip axis generally approach one another above the handle assembly when the mower is in an operating configuration. The system also includes a first control lever associated with the first hand grip, where the first control lever is pivotable about a first pivot axis, the first pivot axis being substantially parallel to the first grip axis. A second control lever associated with the second hand grip is also included. The second control lever is pivotable about a second pivot axis, wherein the second pivot axis is substantially parallel to the second grip axis.

In yet another embodiment, an operator control system for a self-propelled, walk-behind or ride-behind lawn mower is provided. The control system includes a handle assembly having a first hand grip having a first grip axis and a second hand grip having a second grip axis. The first grip axis and the second grip axis generally intersect above the handle assembly when the mower is in an operating configuration. Further, the first hand grip and the second hand grip each form ends of the handle assembly. A first control lever associated with the first hand grip is also included wherein the first control lever is pivotable about a first pivot axis. Further, a second control lever associated with the second hand grip is provided wherein the second control lever is pivotable about a second pivot axis. The first pivot axis is substantially parallel to the first grip axis and the second pivot axis is substantially parallel to the second grip axis.

The above summary of the invention is not intended to describe each embodiment or every implementation of the present invention. Rather, a more complete understanding of the invention will become apparent and appreciated by reference to the following detailed description and claims in view of the accompanying drawings.

BRIEF DESCRIPTION OF THE DRAWINGS

The present invention will be further described with reference to the drawings, wherein:

FIGS. 6–10 are enlarged views of a neutral position latching device shown in various positions, (FIG. 6 illustrates a drive control lever secured in a first or neutral position by the latching device; FIG. 7 illustrates the latching device pivoted for release of the drive control lever; FIG. 8 illustrates the drive control lever in a second or forward position relative to the latching device; FIG. 9 illustrates the latching device relative to the drive control lever while the latter is in the second position; and FIG. 10 illustrates the latching device relative to the drive control lever while the latter is in a third or reverse position);

DETAILED DESCRIPTION OF EXEMPLARY EMBODIMENTS

In the following detailed description of the embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
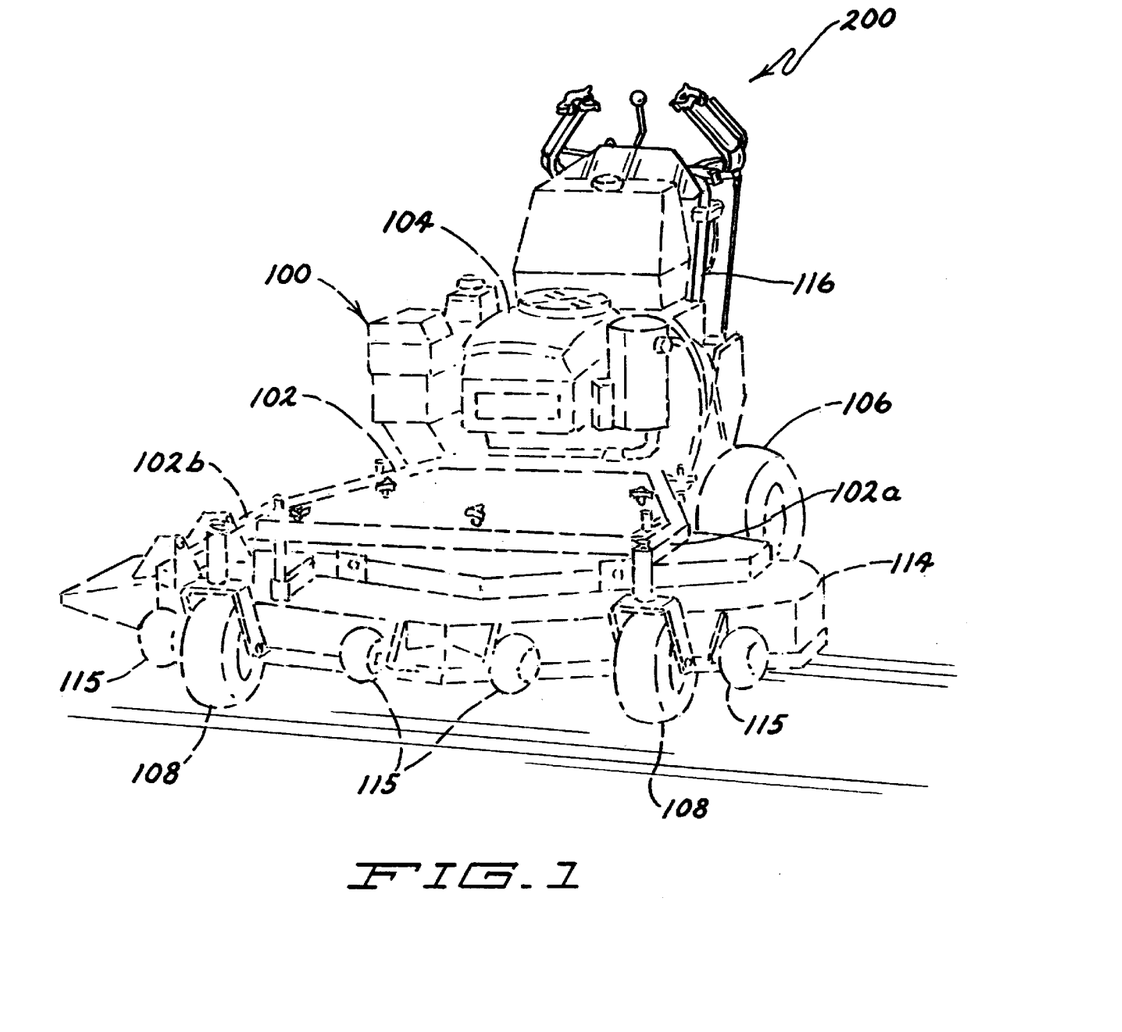
FIG. 1 is a left front perspective view of a self-propelled vehicle, e.g., a mid-size, walk-behind mower, incorporating an operator control system in accordance with one embodiment of the present invention.

FIG. 1 shows an operator control system 200 in accordance with one embodiment of the present invention as the latter may be incorporated on a self-propelled vehicle, e.g., a mid-size, walk-behind lawn mower 100. While, for the sake of brevity, the invention is herein described with respect to a particular mid-size, walk-behind lawn mower (hereinafter generically referred to merely as "walk-behind mower," or, more generally, as "mower"), those of skill in the art will realize that the invention is equally applicable to other walk-behind mowers, ride-behind mowers (e.g., such as those utilizing sulkies), and conventional ride-on mowers as well as to most any other walk-behind, ride-behind, or ride-on self-propelled, ground working vehicle, e.g., skid-steer loader, aerator, snow thrower, tiller, etc.

While the general construction of the mower 100 is not considered central to the invention, it will now be briefly described. FIG. 1 illustrates an exemplary mower 100 (shown primarily in broken lines) having a frame 102 supporting a prime mover, e.g., internal combustion engine 104. A pair of transversely opposing, ground engaging drive wheels 106 (only left wheel visible) may support the rear of the mower 100 in rolling engagement with the ground. Each drive wheel 106 may be powered by a hydraulic motor (not shown) which receives hydraulic power from a hydraulic pump 107 (best shown in FIG. 3) under the control of various operator-controlled valves. The hydraulic pumps 107, in turn, may be separately powered by the engine 104. While not illustrated, other drive systems, e.g., gear or pulley driven systems, are also within the scope of the invention.

Operator controls, as further described below, permit independent control of the speed and direction of each drive wheel 106, allowing control of mower speed and direction from a walking or riding position generally aft, e.g., behind, the mower 100. A pair of front swiveling caster wheels 108, which are preferably connected to forwardly extending frame rails 102a and 102b, may support the front of the mower 100 in rolling engagement with the ground.

As used herein, relative terms such as "left," "right," "fore," "forward," "aft," "rearward," "top," "bottom," "upper," "lower," "horizontal," "vertical," and the like are from the perspective of one operating the mower 100 while the mower is in an operating configuration, e.g., while the mower 100 is positioned such that the wheels 106 and 108 rest upon a generally horizontal ground surface as shown in FIG. 1. These terms are used herein to simplify the description, however, and not to limit the scope of the invention in any way.

Although the illustrated mower has the drive wheels 106 in the rear and the caster wheels 108 in front, this configuration is not limiting. For example, other embodiments may reverse the location of the wheels, e.g., drive wheels in front and caster wheels in back. Moreover, other configurations may use different wheel configurations altogether, e.g., a tri-wheel configuration. These and other embodiments are possible without departing from the scope of the invention.

A cutting deck 114 may be mounted to a lower side of the frame 102 generally between the drive wheels 106 and the caster wheels 108. The cutting deck 114 includes one or more cutting blades (not shown) as known in the art which are operatively powered by the engine 104. During operation, power is selectively delivered to the cutting deck 114, whereby the blades rotate at a speed sufficient to sever grass and other vegetation passing underneath the cutting deck. The cutting deck 114 may optionally include deck rollers 115 to further support the cutting deck relative to the ground during operation.

Figure 2:
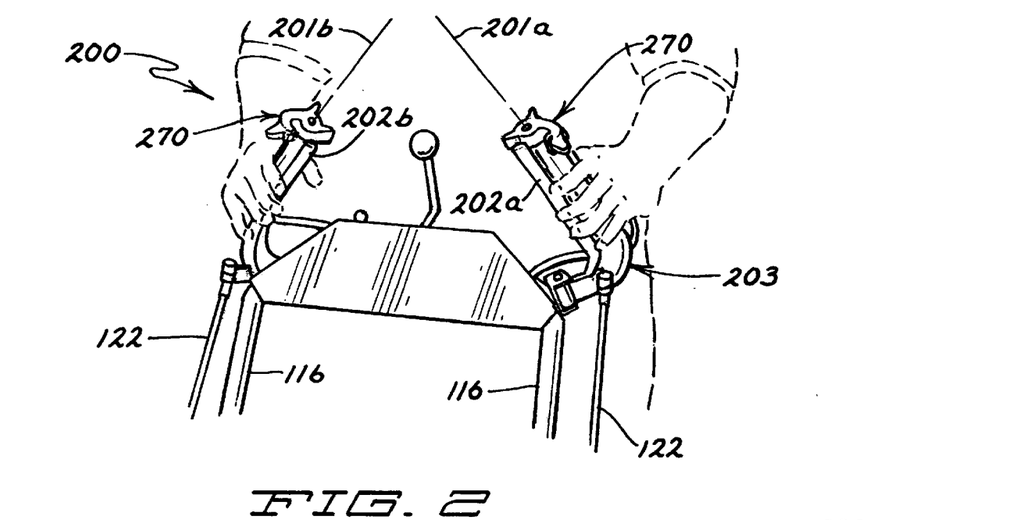
FIG. 2 is an enlarged, partial perspective view of the operator control system of FIG. 1.
Figure 3:
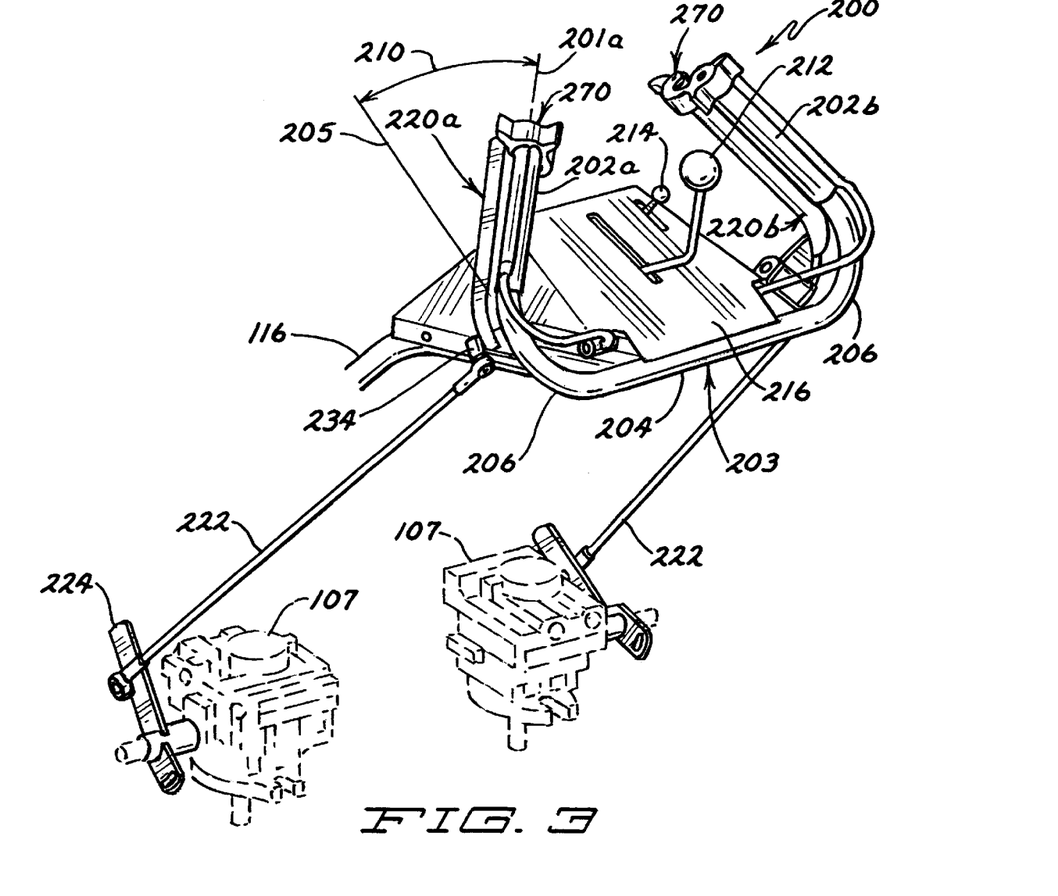
FIG. 3 is a left rear perspective view of the operator control system of FIG. 1.

As illustrated in FIGS. 2–3, the operator control system 200 may include a first hand grip 202a and a second hand grip 202b. To support the operator control system 200, one or more structural members such as arms 116 may extend between the frame 102 and the control system 200, e.g., the arms 116 may extend upwardly and rearwardly from the mower frame 102 (best shown in FIG. 1). While shown and described as arms 116, most any comparable structure is possible without departing from the scope of the invention. For example, plate and/or sheet metal structures may be used in place of, or in addition to, the arms 116.

The suffixes "a" and "b" are used throughout this description to denote various left and right side parts/features, respectively. However, in most pertinent respects, the parts/features denoted with "a" and "b" suffixes are either substantially identical to, or mirror images of, one another. Therefore, such items may, where appropriate, be referred to generically or collectively without the suffix, e.g., "hand grip 202" may refer to either or both hand grip 202a and hand grip 202b. It is understood that, unless otherwise noted, the description of an individual part/feature, e.g., the description of a part/feature identified with an "a" suffix, also applies to the opposing part/feature, e.g., the part/feature identified with a "b" suffix. Similarly, the description of a part/feature identified with no suffix applies to both the corresponding left and right part/feature, e.g., to both the part/feature identified with the "a" suffix and the "b" suffix.

In some embodiments, the hand grips 202 form ends of a continuous handle assembly 203 which may also include a substantially transverse tube member or portion 204 and curved portions 206 as shown in FIG. 3. As the figures illustrate, the curved portions 206 and hand grips 202 may result in a generally bull-horn-shaped handle assembly 203.

The bull-horn shape of the handle assembly 203 yields hand grips 202 that are preferably generally inclined upwardly and towards one another. In other words, a first grip axis 201a of the first grip 202a may approach a second grip axis 201b of the second grip 202b at a point above the handle assembly, 203 as shown in FIG. 2. Preferably, although not necessarily, the hand grips 202 are generally straight and lie within a common plane (e.g., the grip axis 201a of the hand grip 202a may be coplanar with the grip axis 201b of the hand grip 202b). In embodiments where the hand grips 202 do lie within the same plane, the grip axis 201a may intersect the grip axis 201b at a point above the grip assembly 203. While not limited thereto, the grip axis 201 of each hand grip 202 may be inclined at an angle 210 (see FIG. 3) of 30 degrees to 60 degrees and, more preferably, at an angle 210 of 30 to 40 degrees, measured from a respective line 205 formed by the intersection of the plane of the hand grips 202 and a vertical plane.

Figure 13:
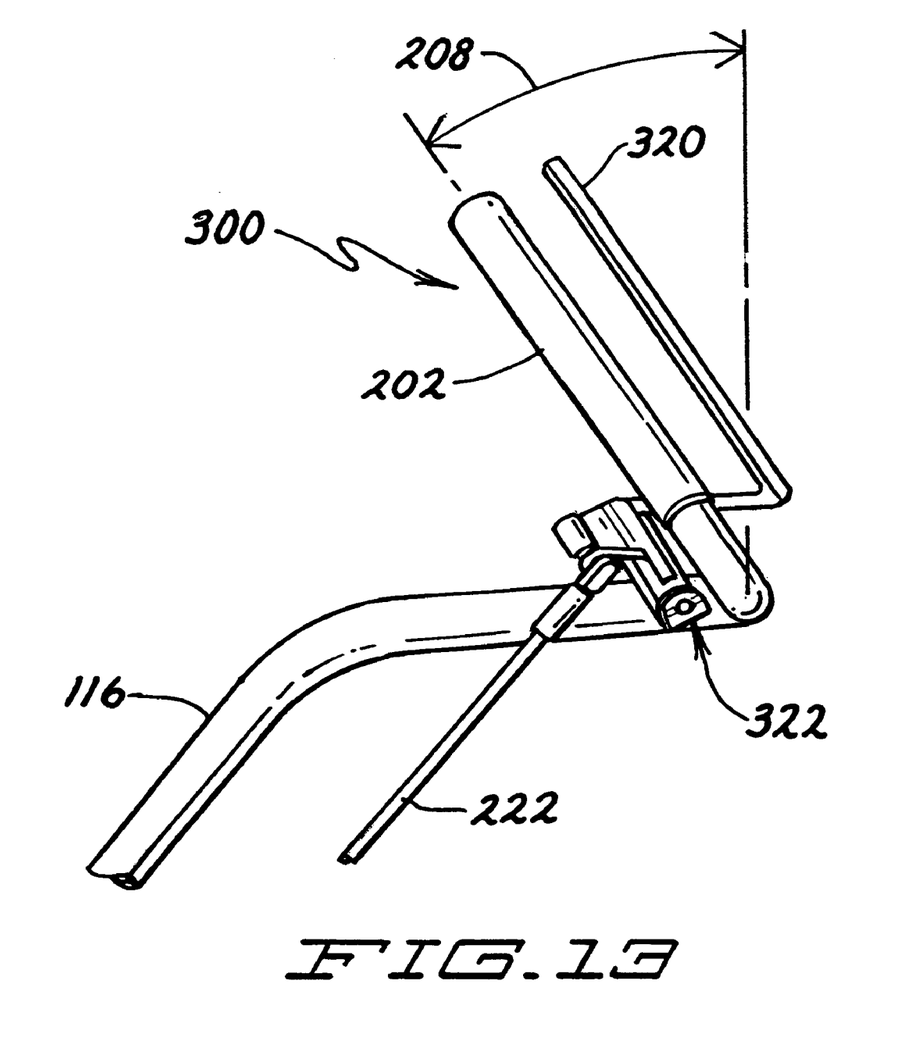
FIG. 13 is a side elevation view of an operator control system in accordance with another embodiment of the invention.

The hand grips 202 may also be inclined forwardly relative to a vertical plane passing through a lowermost portion of the handle assembly 203, e.g., passing through a lowermost portion of the first hand grip 202a, as generally indicated in the figures (see e.g., FIG. 13). While not limited thereto, some embodiments may be configured with the hand grips 202 inclined forwardly from the vertical plane at an angle 208 (see FIG. 13) of between 30 degrees and 60 degrees and, more preferably, at an angle 208 between 30 degrees and 40 degrees.

As those of skill in the art will realize, the shape and orientation of the handle assembly 203, e.g., the hand grips 202, provides the operator with comfortable hand positioning during operation (see FIG. 2). Further, by positioning the operator's hands interior to the periphery of the handle assembly 203, e.g., inboard or interior to the curved portions 206, the chance of inadvertent contact between the hands and obstacles during operation may be reduced.

Figure 4:
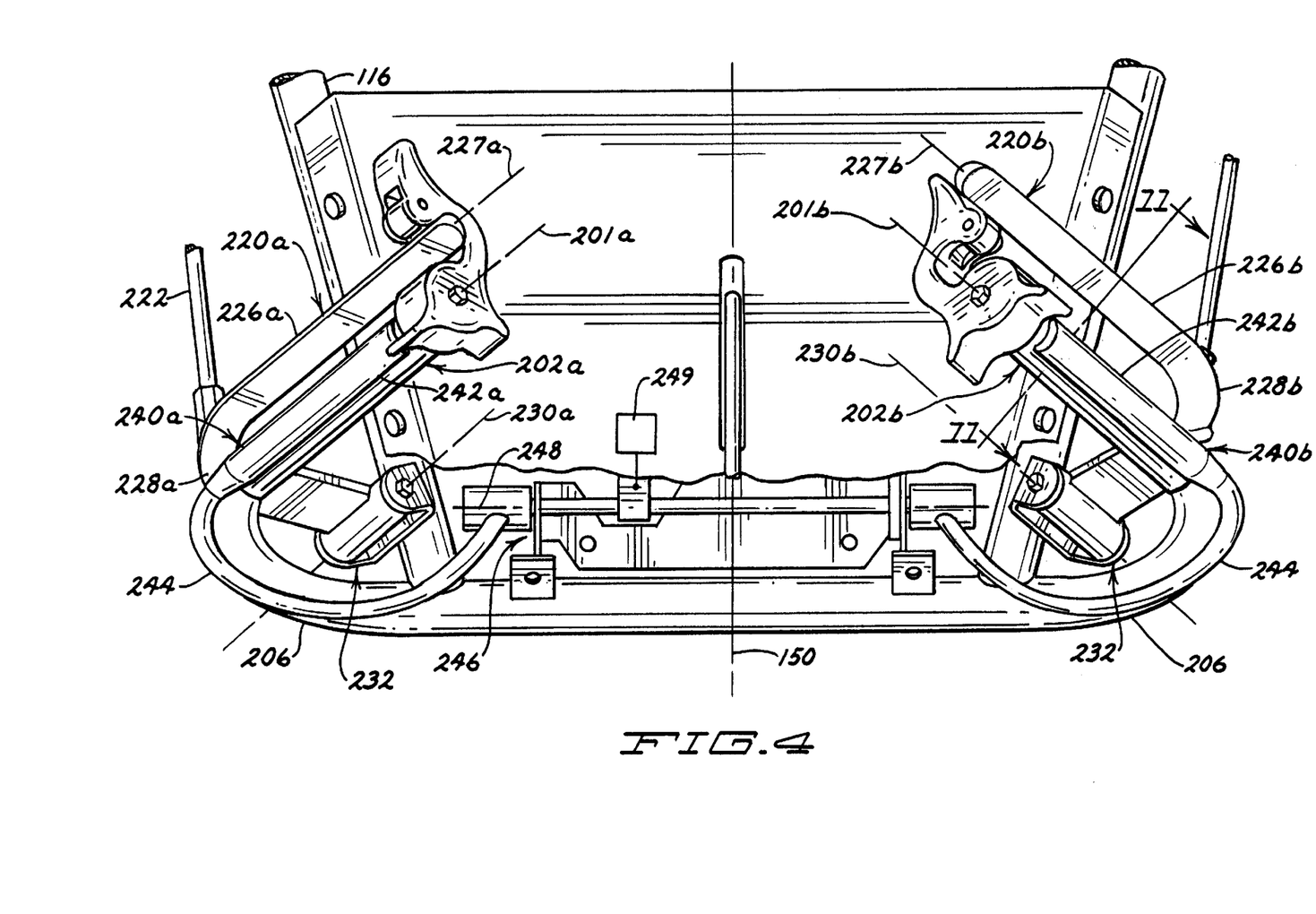
FIG. 4 is a top plan view of the operator control system of FIG. 1.

The handle assembly 203 may attach to the arms 116 in any number of ways. For example, the handle assembly 203 may be welded to the arms 116 as shown in FIG. 4. Alternatively, the handle assembly 203 may be fastened to the arms 116 using, for example, mechanical fasteners, adhesives, or the like. In still other embodiments, the hand grips 202 may be integrally formed with the arms 116, e.g., the ends of arms 116 may form the hand grips 202. In the case of the latter, the transverse tube portion 204, the curved portions 206, or both, may be optional.

Various control devices are mounted on or in close proximity to the handle assembly 203 as illustrated in FIG. 3. For example, a transmission lever 212 may be provided to allow drive parameter selection, e.g., forward speed, while a throttle 214 may be provided to control engine speed. Other controls not central to the invention, e.g., starter, choke, etc., although not illustrated, may also be provided. A cover 216 may be further included to offer a more aesthetically pleasing appearance as well as to shield various moving parts.

To control power delivery to the drive wheels 106, the operator control system 200 preferably includes a first control lever, e.g., a first drive control lever 220a, and a second control lever, e.g., a second drive control lever 220b, as clearly illustrated in FIGS. 3 and 4. The drive control levers 220 are coupled to respective hydraulic pumps 107 via tie rods 222. When a drive control lever 220 is manipulated as described below, the corresponding tie rod 222 pivots a lever arm 224 on the pump 107, manipulating a hydraulic valve (not shown) which controls hydraulic flow to the respective drive wheel motor (also not shown).

Each drive control lever 220 preferably has a shape similar to the corresponding hand grip 202 as shown in FIG. 4, e.g., the drive control lever 220a, similar to the drive control lever 220b, may have a grip portion 226a defining a lever axis 227a substantially parallel to the grip axis 201a of the respective hand grip 202a. Optionally, each drive control lever 220 may include a curved portion 228 having a shape that generally corresponds to the shape of the respective curved portion 206, e.g., curved portion 228a may have generally the same radius of curvature as the respective curved portion 206. While the grip portion 226 is described and illustrated as straight, other shapes are also possible without departing from the scope of the invention.

Each drive control lever 220 may pivotally coupled to the mower 100 (e.g., to the handle assembly 203 or, as shown in FIG. 4, to the arms 116) via a pivot assembly 232. Preferably, the pivot assembly 232 permits pivoting of the drive control lever 220 about an axis substantially parallel to the respective hand grip 202, e.g., the drive control lever 220a pivots about a pivot axis 230a that is substantially parallel to the grip axis 201a of the hand grip 202a. The tie rod 222 is coupled to the drive control lever 220 at a tie rod pivot 234 (see FIGS. 3 and 5) located a predetermined distance from the pivot axis 230 to provide the desired tie rod movement for a given drive control lever 220 movement.

Because of the substantially parallel orientation of the pivot axis 230 to the axes 201 and 227, the lever axis 227 of the drive control lever 220 remains generally parallel to the grip axis 201 of the respective hand grip 202 throughout the range of motion of the drive control lever 220, e.g., the grip portion 226a of the drive control lever 220a remains parallel to its respective hand grip 202a. As a result, the force required to manipulate each drive control lever 220 is substantially uniform throughout the travel of the drive control lever 220. Moreover, because the lever axis 227 of the drive control lever 220 is parallel to the axis 201 of the hand grip 202, the operator is able to grasp the drive control lever 220 with most, if not all, fingers (see FIG. 2) regardless of the particular position of the drive control lever within its travel.

Figure 5:
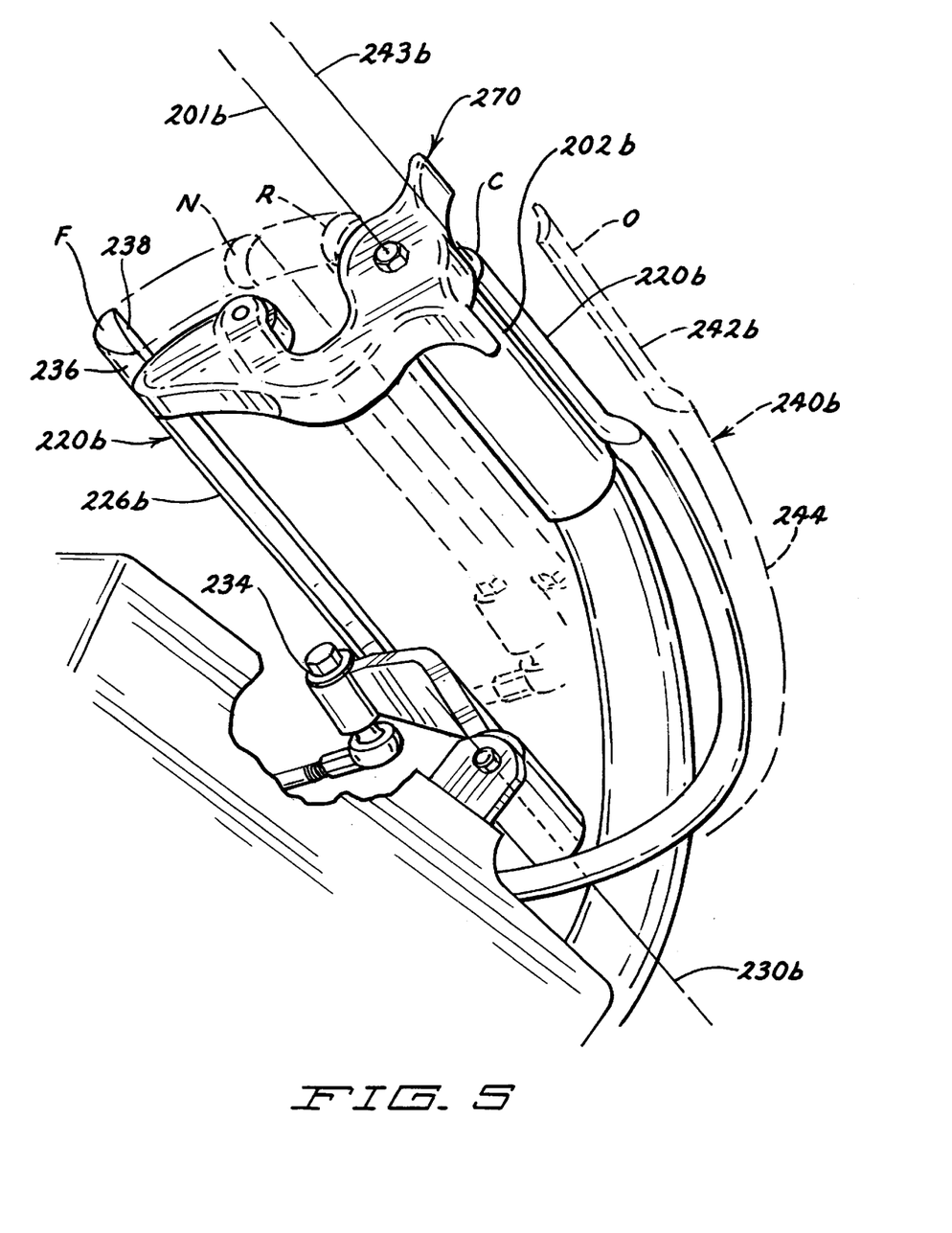
FIG. 5 is a partial perspective view of a right side portion of the control system of FIG. 1 with a left side portion removed for clarity.

To further improve operator comfort during mower 100 use, each drive control lever 220 may have a cross section defined by one or more curved surfaces. For example, FIG. 5 illustrates an exemplary grip portion 226b with a curved, e.g., convex or semi-cylindrical, surface 236 and a generally planar surface 238. Other embodiments may include a concave surface in place of the planar surface 238 such that the drive control lever 220 corresponds to the shape of the hand grip 202 when the drive control lever 220 is proximate thereto. Other embodiments may vary the shape or the radius of curvature of the curved surface 236. Preferably, the curved surface 236 permits grasping by the operator without resulting in excessive pressure at any point along the operator's fingers.

FIG. 5 also illustrates the range of motion of the drive control lever 220. In this figure, the drive control lever 220b is illustrated in solid lines in a forward position identified as "F." Preferably, the drive control levers 220 are biased towards the forward position F. The forward position F corresponds to the respective hydraulic pump 107 (see FIG. 3) providing maximum hydraulic flow for forward motion of the mower 100. Each drive control lever 220 may also be movable to a reverse position "R" by squeezing the drive control lever 220, e.g., drive control lever 220b, towards the hand grip 202, e.g., hand grip 202b. The reverse position R corresponds to the respective hydraulic pump 107 (see FIG. 3) providing maximum hydraulic flow for reverse motion of the mower 100.

Each drive control lever 220 may also be movable to any position between the forward position F and the reverse position R. In some embodiments, the drive control lever 220, when in an intermediate or neutral position, e.g., a position identified as N in broken lines in FIG. 5, may place the respective hydraulic pump 107 (see FIG. 3) in a static configuration. That is, when the drive control lever 220 is in the neutral position N, differential flow output from the pump 107 may be effectively terminated such that no driving power is delivered to the respective wheel 106. In some embodiments, the neutral position N could configure internal valving of the respective hydraulic pump 107 into a cross-ported configuration such that the respective wheel 106 could freewheel without substantial hydraulic resistance. As a result, the mower 100 could, when both levers 220 are in the neutral position N, be moved without starting the engine.

Accordingly, drive control systems in accordance with the present invention provide intuitive control of mower 100. For instance, incremental forward movement of both drive control levers 220 from the neutral position N to the forward position F results in forward propulsion of the mower 100 at incrementally increasing speed. Similarly, incremental rearward motion of both drive control levers 220 from the neutral position N to the reverse position R results in incrementally increasing reverse speed. By manipulating the drive control lever 220a and drive control lever 220b independently between the forward position F and the reverse position R, the operator can control both speed and direction of the mower 100. For example, while one drive control lever, e.g., 220a, may be commanded for mower movement in a first direction at a first speed, the opposite drive control lever, e.g., 220b, may be commanded for mower movement in the same or opposite direction at the same or different speed.

Some embodiments of the present invention may optionally include a latching device, e.g., a neutral lock 270, of which one configuration is shown in FIG. 5. The neutral lock 270 permits the operator to temporarily lock the drive control lever 220 in at least one predetermined position, e.g., in the neutral position N. By permitting locking of each drive control lever 220 in the neutral position N, the operator may suspend operation and release one or more secondary levers, e.g., an operator presence control (hereinafter "OPC") lever 240 further described below, without inadvertently stopping the engine 104.

FIGS. 6–10 illustrate end views of the hand grip 202b showing the neutral lock 270 in various positions relative to the drive control lever 220b. The hand grip 202a also preferably includes a neutral lock 270 (see e.g., FIG. 3) which operates in a manner generally identical to that described below.

Figure 6:
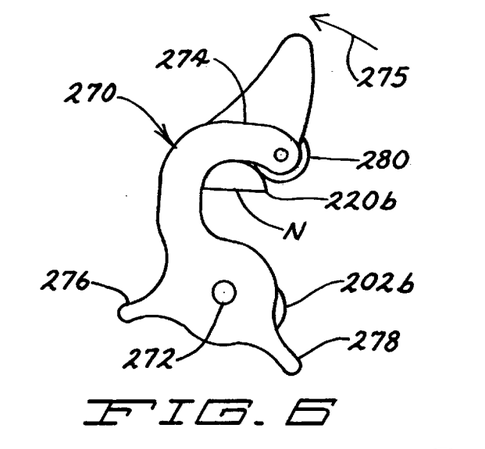
Figure 7:
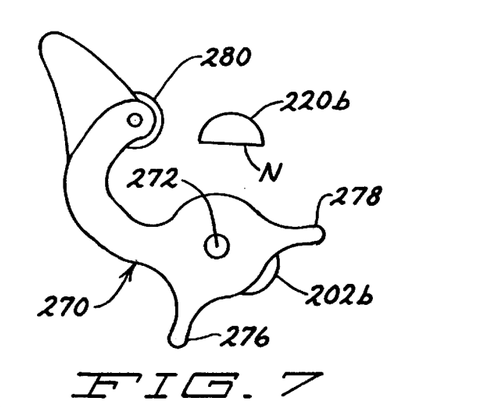

In the embodiments illustrated herein, the neutral lock 270 is pivotable about an end of the hand grip 202b, e.g., about a latch pivot axis 272 which may be generally parallel and preferably coaxial to the grip axis 201b of the hand grip 202b (see FIG. 4), between a locked position (see FIG. 6) and an unlocked position (see FIG. 7).

The neutral lock 270 may include a hook portion 274 for capturing the drive control lever 220b when the latter is in the first or neutral position N as generally shown in FIG. 6. To disengage the neutral lock 270 from the locked position of FIG. 6, it may be manually pivoted about the pivot axis 272 in a direction 275 to the unlocked position illustrated in FIG. 7. While the neutral lock 270, as illustrated in FIGS. 5 and 6–10, may be configured with an outwardly opening mouth, other embodiments may utilize a neutral lock 270 having an inwardly opening mouth as generally shown in FIGS. 1 and 2. To assist the operator with pivoting the neutral lock 270, thumb tabs 276 and 278 may be included. Optionally, a friction-reducing member/device, e.g., a roller 280, may be provided to assist with moving the neutral lock 270 past to the drive control lever 220b.

To provide rotational resistance to the neutral lock 270, a friction device (not shown) may be incorporated. For example, the neutral lock 270 may be fastened to the hand grip 202b with a fastener between which one or more spring disc washers as known in the art are provided. By controlling the installation torque of the fastener, the axial clamping force applied to the neutral lock 270 by the spring washers may be varied, thus altering the neutral lock's resistance to rotational movement. Other friction devices may also be used without departing from the scope of the invention.

Figure 8:
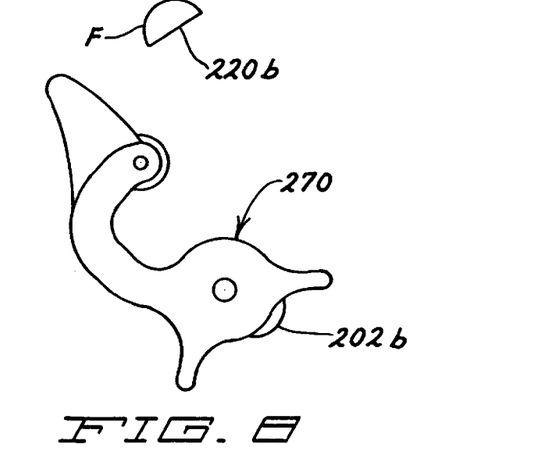
Figure 9:
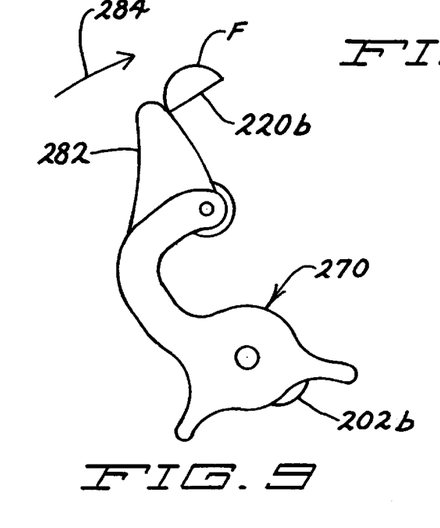
Figure 10:
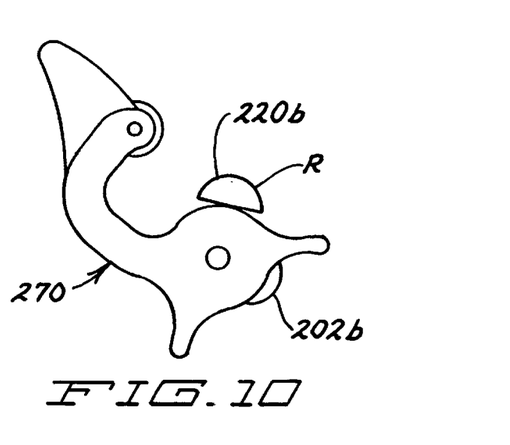

Once the neutral lock 270 is moved to the unlocked position illustrated in FIG. 7, the drive control lever 220b is free to move to the forward position F as shown in FIG. 8. A pivot limiting device, e.g., ear 282 as shown in FIG. 9, may be included with the neutral lock 270 to prevent engagement of the neutral lock 270, e.g., rotation of the neutral lock 270 in the direction 284, when the drive control lever 220b is in the forward position F. FIG. 10 illustrates the relative locations of the drive control lever 220b and the neutral lock 270 when the drive control lever 220b is in the reverse position R.

Various embodiments of operator control systems in accordance with the present invention may further include one or more operator presence control (OPC) devices as shown in FIGS. 4 and 5. OPC devices are typically configured to terminate mower operation, e.g., stop the engine 104, in some circumstances unless operator presence is detected. In the instant invention, the OPC device may be configured as one or more secondary or OPC levers 240 positioned proximate the respective hand grips 202 opposite the drive control lever 220, e.g., aft of the hand grip. Like the drive control lever 220, each OPC lever 240 may comprise a generally straight gripping portion 242 and a curved portion 244. The gripping portion 242 and the curved portion 244 have shapes that may generally correspond to that of the hand grip 202 and the curved portion 206, respectively.

OPC levers 240 in accordance with the present invention may operatively couple to an interlock switch 249 (as known in the art and diagrammatically represented in FIG. 4) and manipulate it between an open configuration and a closed configuration. Generally speaking, mower, e.g., engine 104, operation is disabled when the interlock switch 249 is in its open configuration and allowed when the interlock switch 249 is in its closed configuration.

The OPC levers 240 are preferably biased towards a disengaged, normally open position identified as "O" in broken lines in FIG. 5. The open position O preferably corresponds to the interlock switch 249 being in its open configuration (mower disabled). To operate the mower 100, at least one of the OPC levers 240 may be squeezed towards the respective hand grip 202 to a closed, e.g., engaged, position identified as "C" in solid lines in FIG. 5. The closed position C preferably corresponds to the interlock switch 249 being in its closed configuration (mower enabled).

In some embodiments, the OPC lever 240 may be movable between the open position O and the closed position C by pivoting about an OPC pivot 246 having a pivot axis 248 that is generally transverse to a longitudinal axis 150 of the mower 100 as shown in FIG. 4. The gripping portions 242 may each, in some embodiments, define a secondary lever axis 243 (see e.g., axis 243b in FIG. 5) which is substantially parallel to the axis 201 of the respective hand grip 202 when the OPC lever is in the closed position C.

Preferably, one OPC lever 240 is associated with each hand grip 202, e.g., OPC levers 240a and 240b may be provided as shown in FIG. 4. The OPC levers 240 may further be configured such that they form a single lever. As a result, the operator may engage the interlock switch 249 with one OPC lever 240, e.g., the interlock switch may be engaged by holding either one or both OPC levers 240a and 240b in the closed position C (see FIG. 5). However, should the operator release both levers 240a and 240b, they will return to their open position O, opening the interlock switch 249 and thus disabling the mower from further operation.

Like the drive control levers 220, the OPC levers 240 may be configured to assist in reducing operator fatigue. For example, the cross-sectional shape of at least the gripping portion 242 (see e.g., 242a in FIG. 5) may be configured to generally correspond to the exterior profile of the hand grip 202 as shown in FIG. 11.

As illustrated in this Figure, each hand grip 202 may comprise a rigid or semi-rigid core portion 286 which, in one embodiment, is made from steel or aluminum. To provide more comfortable gripping, the core portion 286 of the hand grip 202 may optionally be surrounded, at least in part, by a gripping layer 288. While not limited thereto, the gripping layer 288 may preferably be made from a compressible material such as foam rubber. As FIG. 11 illustrates, the gripping layer 288 defines an outer radius 290 of the hand grip 202.

Figure 11:
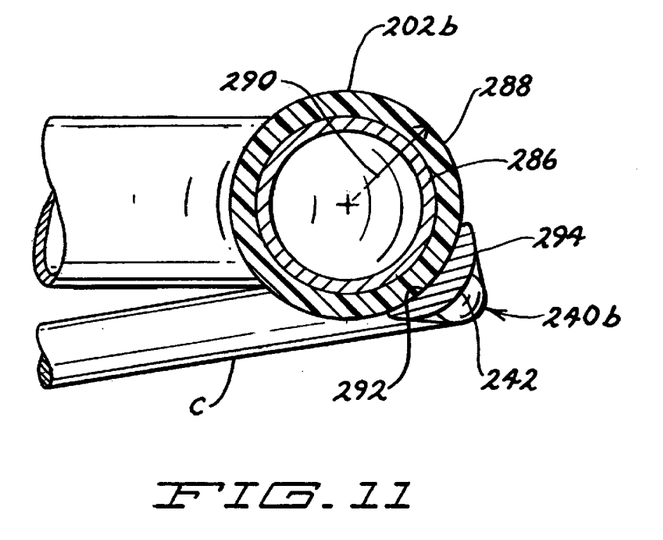
FIG. 11 is an enlarged section view taken along line 11—11 of FIG. 4 illustrating the cross-sectional shape of an operator presence control lever.

The OPC lever 240 may define a cross-sectional shape having a surface 292 which preferably conforms to a cross-sectional shape of the hand grip 202 when the OPC lever 240 is in the closed position C (as shown in FIG. 11). In the illustrated embodiment of FIGS. 11 and 12, the surface 292 is concave having an inner radius 291 generally equal in size to the outer radius 290. As a result, the OPC lever 240 contacts the hand grip 202 along most, if not all, of the surface 292.

Figure 12:
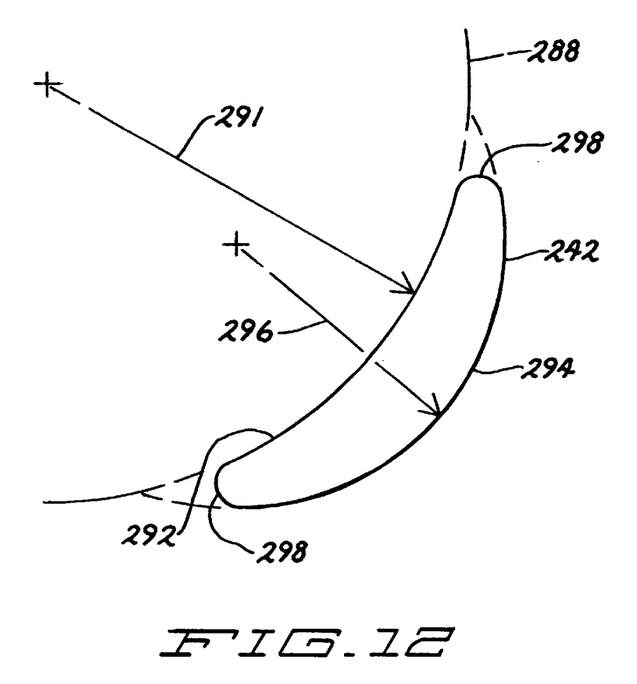
FIG. 12 is an enlarged end view of a portion of the operator presence control lever of FIG. 11.

The OPC lever 240 may be further defined by a convex surface 294 having a radius 296. Preferably, the radius 296 of the convex surface 294 is less than the radius of the concave surface 292, e.g., the radii 291 and 296 have different centers. This geometry yields a crescent-shaped cross-section as shown in FIG. 12. To avoid sharp edges and to provide a smooth transition to the gripping layer 288, the two surfaces 292 and 294 may blend together at a radius 298.

By providing an OPC cross-sectional shape as described above and shown in FIGS. 11 and 12, smooth transition zones from the edges of the gripping portion 242 of the OPC lever 240 to the hand grips 202 result. Also, the eccentric surfaces 292 and 294 result in the OPC lever gripping portion 242 having a non-uniform thickness, e.g., being somewhat thicker near its middle than near its edges (see FIG. 12). The thicker middle portion provides the operator with a protrusion to grip during operation while the thinner edges provide a gradual transition from the gripping portion 242 to the hand grip 202. As a result, the transition from the OPC lever 240 to the hand grip 202 produces relatively few pressure points.

As noted above, the embodiments described and illustrated herein are exemplary only. Other configurations are certainly possible without departing from the scope of the invention. For example, the hand grips 202 may have different cross-sectional shapes, e.g., an oval. When so configured, various corresponding surfaces, e.g., the surface 292 of the OPC lever 240 (see FIG. 12) and/or the surface 238 of the drive control lever 220 (See FIG. 5) may be reconfigured to correspond to the new cross-sectional shape of the hand grip 202.

The OPC lever 240 may also be configured to pivot about an axis generally parallel to the axis 201 of the hand grip 202 (see FIG. 4) rather than about the transverse axis 248 (see also FIG. 4) described herein.

In still other embodiments, an operator control system 300 may be configured such that a drive control lever 320 is located aft of, i.e., behind, the hand grip 202 as shown in FIG. 13. The drive control lever 320 may still pivot about a pivot assembly 322 having a pivot axis substantially parallel to an axis of the hand grip 202. Movement of the drive control lever 320 may reposition the tie rod 222 as described above. While not shown, neutral locks and OPC levers may be reconfigured to accommodate this revised drive control lever structure.

While not illustrated, still other embodiments may have hand grips 202 configured to extend downwardly and outwardly rather than upwardly and inwardly. That is, the hand grips, e.g., hand grips 202, may couple to the mower 100 at or near their uppermost end and extend downwardly and outwardly therefrom. However, such embodiments may still result in axes 201a and 201b (see FIG. 2) that approach and/or intersect one another above the grip assembly 203.

Exemplary embodiments of the present invention are described above. Those skilled in the art will recognize that many embodiments are possible within the scope of the invention. Other variations, modifications, and combinations of the various parts and assemblies can certainly be made and still fall within the scope of the invention. Thus, the invention is limited only by the following claims, and equivalents thereto.

What is claimed is:

1. An operator control system for a self-propelled lawn mower, the control system comprising:
   a handle assembly comprising a first hand grip defining a first grip axis and a second hand grip defining a second grip axis, wherein the first grip axis and the second grip axis generally approach one another above the handle assembly when the mower is in an operating configuration;
   a first control lever associated with the first hand grip, the first control lever pivotable about a first pivot axis, wherein the first pivot axis is substantially parallel to the first grip axis; and
   a second control lever associated with the second hand grip, the second control lever pivotable about a second pivot axis, wherein the second pivot axis is substantially parallel to the second grip axis.

2. The control system of claim 1, wherein the first grip axis and the second grip axis intersect at a point above the handle assembly.

3. The control system of claim 1, wherein the first control lever defines a first lever axis substantially parallel to the first grip axis.

4. The control system of claim 1, wherein the second control lever defines a second lever axis substantially parallel to the second grip axis.

5. The control system of claim 1, further comprising a secondary lever having a gripping portion, the secondary lever associated with one or both of the first hand grip and the second hand grip, the secondary lever pivotable about an axis generally transverse to a longitudinal axis of the lawn mower.

6. The control system of claim 5, wherein the secondary lever is pivotable between an engaged position and a disengaged position, wherein, in the engaged position, the gripping portion of the secondary lever is substantially adjacent to at least a portion of the first hand grip.

7. The control system of claim 6, wherein the gripping portion of the secondary lever defines a secondary lever axis which is substantially parallel to the first grip axis when the secondary lever is in the engaged position.

8. The control system of claim 5, wherein the first hand grip has a first cross-sectional shape.

9. The control system of claim 8, wherein at least the gripping portion of the secondary lever has a second cross-sectional shape which substantially conforms to at least a portion of the first cross-sectional shape.

10. The control system of claim 9, wherein the second cross-sectional shape has a non-uniform thickness.

11. The control system of claim 9, wherein the first cross-sectional shape is circular and defines an outer radius; and the second cross-sectional shape is circular and defines an inner radius, the inner radius generally equal in size to the outer radius.

12. The control system of claim 9, wherein the second cross-sectional shape forms a crescent-shape, the crescent-shape comprising a concave surface having a radius substantially equal to an outer radius of the first hand grip, and a convex surface having a radius less than the radius of the concave surface.

13. The control system of claim 1, further comprising a first latching device adapted to latch the first control lever in at least a first position.

14. The control system of claim 13, wherein the first latching device is coupled to the first hand grip.

15. The control system of claim 14, wherein the first latching device is adapted to pivot about a latch pivot axis which is generally parallel with the first grip axis.

16. The control system of claim 13, wherein the first latching device is coupled to an end of the first hand grip.

17. The control system of claim 13, further comprising a second latching device adapted to latch the second control lever in at least a first position.

18. An operator control system for a self-propelled, walk-behind or ride-behind lawn mower, the control system comprising:

a handle assembly comprising a first hand grip having a first grip axis and a second hand grip having a second grip axis, wherein the first grip axis and the second grip axis generally intersect above the handle assembly when the mower is in an operating configuration, and further wherein the first hand grip and the second hand grip each form ends of the handle assembly;

a first control lever associated with the first hand grip, the first control lever pivotable about a first pivot axis; and a second control lever associated with the second hand grip, the second control lever pivotable about a second pivot axis;

wherein the first pivot axis is substantially parallel to the first grip axis and the second pivot axis is substantially parallel to the second grip axis.

19. The control system of claim 18, wherein the first pivot axis generally intersects the second pivot axis at a point above the handle assembly.

20. The control system of claim 18, wherein the first hand grip and the second hand grip are, when the mower is in the operating configuration, forwardly inclined at an angle relative to a vertical plane passing through a lowermost portion of one or both of the first hand grip and the second hand grip.

21. The control system of claim 20, wherein the angle is between 30 degrees and 60 degrees.

22. The control system of claim 18, further comprising a first latching device adapted to latch the first control lever in at least a first position, the first latching device pivotally coupled to the first hand grip.

23. The control system of claim 22, wherein the first latching device pivots about a latch pivot axis substantially parallel to the first grip axis.

24. The control system of claim 18, wherein the handle assembly further comprises a transverse member extending in a direction substantially transverse to a longitudinal direction of the mower, the transverse member coupling the first hand grip to the second hand grip.

25. The control system of claim 18, further comprising at least one secondary lever associated with one or both of the first hand grip and the second hand grip, the at least one secondary lever movable between an engaged position and a disengaged position, wherein, in the engaged position, the at least one secondary lever is adjacent to at least a portion of one or both of the first hand grip and the second hand grip.

26. The control system of claim 25, wherein the at least one secondary lever is located on a side of one or both of the first hand grip and the second hand grip generally opposite the first control lever.

27. The control system of claim 25, wherein the at least one secondary lever is pivotable about an axis perpendicular to a longitudinal axis of the mower.

* * * * *